United States Patent
Carro et al.

(10) Patent No.: US 11,954,040 B2
(45) Date of Patent: Apr. 9, 2024

(54) CACHE MEMORY ARCHITECTURE

(71) Applicant: Arm Limited, Cambridge (GB)

(72) Inventors: Alejandro Rico Carro, Austin, TX (US); Douglas Joseph, Leander, TX (US); Saurabh Pijuskumar Sinha, Schertz, TX (US)

(73) Assignee: Arm Limited, Cambridge (GB)

( * ) Notice: Subject to any disclaimer, the term of this patent is extended or adjusted under 35 U.S.C. 154(b) by 100 days.

(21) Appl. No.: 16/901,720

(22) Filed: Jun. 15, 2020

(65) Prior Publication Data
US 2021/0390059 A1 Dec. 16, 2021

(51) Int. Cl.
*G06F 12/08* (2016.01)
*G06F 12/06* (2006.01)
*G06F 12/0811* (2016.01)
*G06F 12/0895* (2016.01)
*G06F 12/0897* (2016.01)

(52) U.S. Cl.
CPC ...... *G06F 12/0897* (2013.01); *G06F 12/0646* (2013.01); *G06F 12/0811* (2013.01); *G06F 12/0895* (2013.01); *G06F 2212/1012* (2013.01); *G06F 2212/283* (2013.01)

(58) Field of Classification Search
None
See application file for complete search history.

(56) References Cited

U.S. PATENT DOCUMENTS

| | | | | |
|---|---|---|---|---|
| 8,612,809 | B2* | 12/2013 | Casper | G06F 11/1076 714/708 |
| 2012/0131278 | A1* | 5/2012 | Chang | G06F 12/0866 711/118 |
| 2013/0283005 | A1* | 10/2013 | Emma | G06F 1/3234 712/12 |
| 2013/0283008 | A1* | 10/2013 | Buyuktosunoglu | H01L 25/0657 712/E9.002 |
| 2015/0032962 | A1* | 1/2015 | Buyuktosunoglu | G06F 12/0811 711/122 |
| 2016/0118095 | A1* | 4/2016 | Pelley | G06F 13/4208 365/51 |
| 2016/0322331 | A1* | 11/2016 | Lim | H01L 23/5286 |
| 2017/0139635 | A1* | 5/2017 | Jayasena | G11C 5/025 |
| 2019/0205244 | A1* | 7/2019 | Smith | G06F 3/065 |
| 2019/0370269 | A1* | 12/2019 | Bogdan | G06F 15/7821 |

FOREIGN PATENT DOCUMENTS

KR  2019013049 A  *  7/2017  ......... G06F 12/0897

* cited by examiner

*Primary Examiner* — Tracy C Chan
(74) *Attorney, Agent, or Firm* — Pramudji Law Group PLLC; Ari Pramudji

(57) ABSTRACT

Various implementations described herein are directed to device. The device may include a first tier having a processor and a first cache memory that are coupled together via control logic to operate as a computing architecture. The device may include a second tier having a second cache memory that is coupled to the first cache memory. Also, the first tier and the second tier may be integrated together with the computing architecture to operate as a stackable cache memory architecture.

20 Claims, 8 Drawing Sheets

100C

Cache Memory Architecture 102,102C

CACHE MEMORY ARCHITECTURE

BACKGROUND

This section is intended to provide information relevant to understanding the various technologies described herein. As the section's title implies, this is a discussion of related art that should in no way imply that it is prior art. Generally, related art may or may not be considered prior art. It should therefore be understood that any statement in this section should be read in this light, and not as any admission of prior art.

In some memory architectural designs, caching logic may not be efficient when expanding to higher orders of caching operations. In reference to external caching logic, high performance caching operations may be difficult to achieve with various conventional memory designs, which are typically designed to implement caching features or practices that respond to and mitigate specific types of delays and/or failures. As such, there exists a need to improve caching logic in physical designs for memory applications.

BRIEF DESCRIPTION OF THE DRAWINGS

Implementations of various techniques are described herein with reference to the accompanying drawings. It should be understood, however, that the accompanying drawings illustrate only various implementations described herein and are not meant to limit embodiments of various techniques described herein.

DETAILED DESCRIPTION

Various implementations described herein refer to cache memory schemes and techniques for three-dimensional (3D) memory applications, including, e.g., physical 3D layout cache memory designs. For instance, various schemes and techniques described herein may provide for multi-tier vertically expandable cache memory architecture, such as, e.g., a computing system that enables configurable and expandable memory caching using 3D vertical stacking configurations along with associated control logic, wherein the configurability may be exercised during periods of 3D stack assembly.

In some implementations, an advanced cache-computing system may include multiple dies, such as, e.g., multiple semiconductor dies including one die with processing cores, interconnect logic and expandable system-level cache dies with zero or more dies having cache storage capabilities. The caching logic may be configurable to allow system configurability during manufacturing with a variable number of system-level cache (SLC) storage dies. Even though various implementations described herein may refer to a 3D expandable system-level cache (SLC), this disclosure should not be necessarily limited to an SLC, and thus, the various implementations described herein may be used by any cache hierarchy. Also, the various cache memory schemes and techniques described herein may use SLC tags that are part of the expandable cache memory dies and/or the core-compute die when including cache storage. In some instances, the SLC tags may also be associated with SLC data entries, and the SLC data may be part of the expandable cache memory dies and/or the core-compute die when having cache storage.

Various implementations of providing cache memory schemes and techniques will be described in detail herein with reference to FIGS. 1A-5.

Figure 1A:
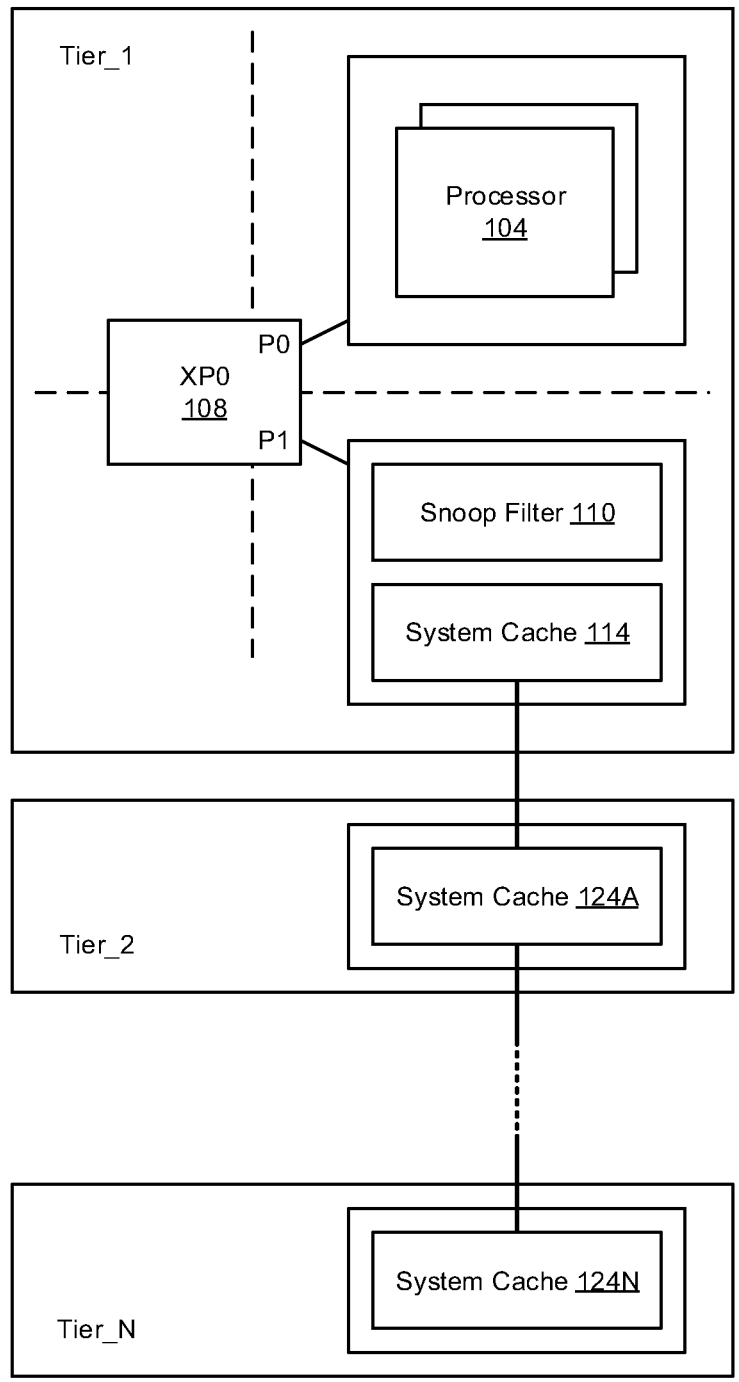
FIGS. 1A-1C illustrate schematic diagrams of cache memory architecture in accordance with various implementations described herein.
Figure 1B:
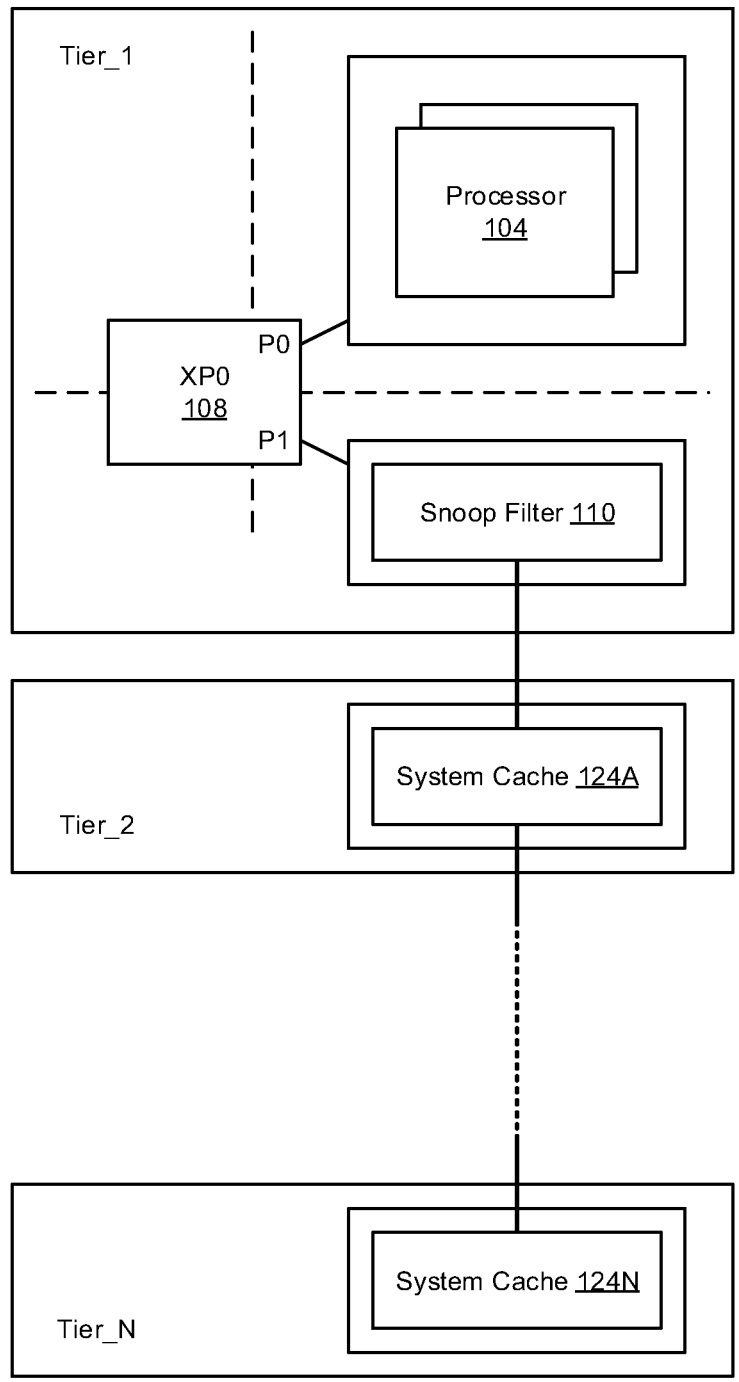
Figure 1C:
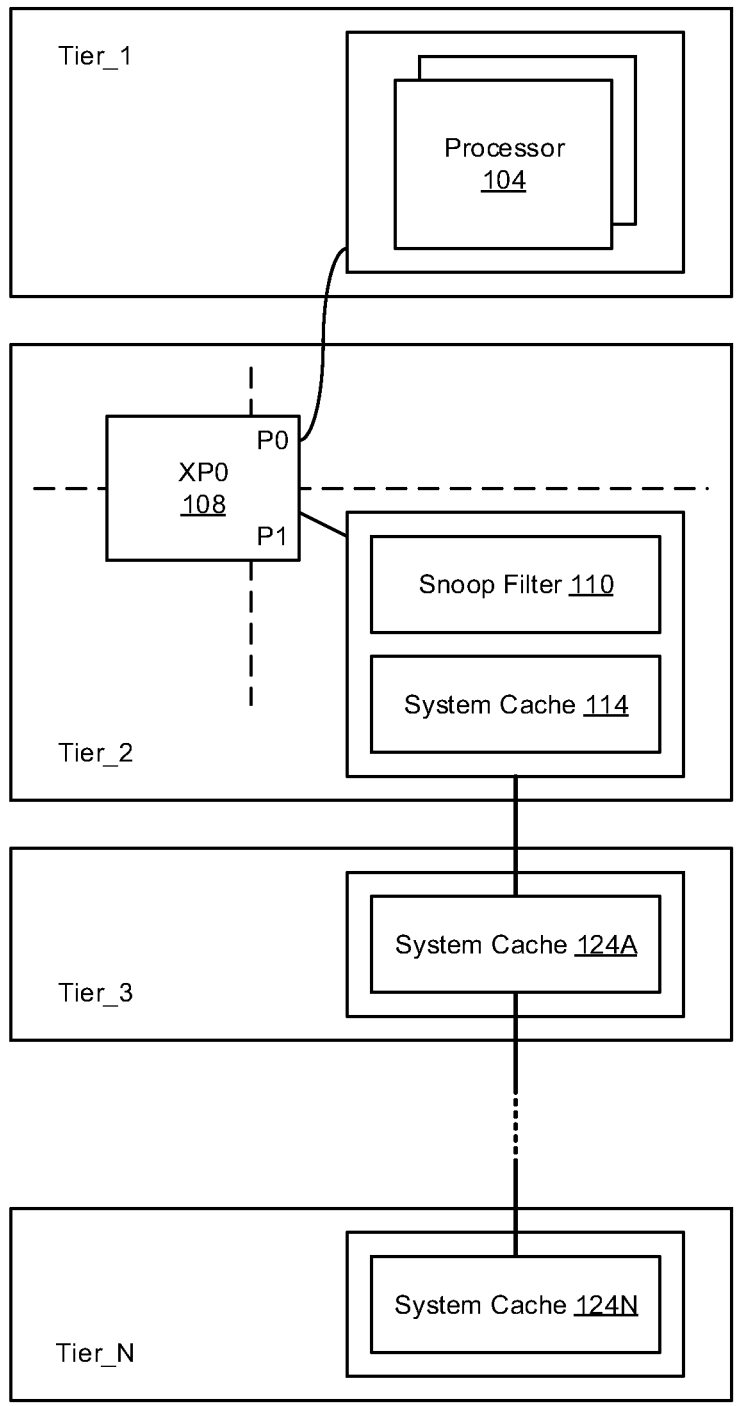

FIGS. 1A-1C illustrate schematic diagrams of cache memory architecture 102 in accordance with implementations described herein. In particular, FIG. 1A provides a schematic diagram 100A of a first physical layout configuration 102A of the cache memory architecture 102, FIG. 1B provides another schematic diagram 100B of another second physical layout configuration 102B of the cache memory architecture 102, and FIG. 1C provides another schematic diagram 100C of another third physical layout configuration 102C of the cache memory architecture 102.

In various implementations, the cache memory architecture 102 in FIGS. 1A-1C may be implemented as a system or a device having various integrated circuit (IC) components that are arranged and coupled together as an assemblage or combination of parts that provide for a physical circuit design and related structures. In some instances, a method of designing, providing and fabricating the cache memory architecture 102 as an integrated system or device may involve use of the various IC circuit components that are described herein so as to thereby implement the various cache memory techniques associated therewith. Further, the cache memory architecture 102 may be integrated with computing circuitry and related components on multiple chips, and the cache memory architecture 102 may be implemented in embedded systems for automotive, electronic, mobile and Internet-of-things (IoT) applications.

As shown in FIG. 1A, the cache memory architecture 102, 102A may include a multi-tier stack configuration, including, e.g., a first tier, a second tier, and a number (N) of additional tiers, that are arranged in a vertically expandable stack. In some instances, the first tier (Tier_1) may be referred to as a home-based tier or a core-compute tier that may be implemented in a home-based core-compute semiconductor die. The remaining tiers (Tier_2, Tier_3, etc.) may be referred to as expandable tiers or dies that are coupled to and controlled by the home-based core-compute semiconductor die.

The first tier (Tier_1) may include one or more processors 104 and a first cache memory 114 that are coupled together via interconnect logic (XP0) 108 so as to operate as a computing architecture. In some instances, the first tier (Tier_1) may be formed as part of a first semiconductor die. Also, in some instances, the interconnect logic (XP0) 108 may be referred to as a routing logic or switching logic that connects the one or more processor cores 104 and the first cache memory 114, and the interconnect logic (XP0) 108 may be implemented as part of the core-compute die. Also, the interconnect logic (XP0) 108 may allow for expandable configurability depending on a number (N) of expandable SLC tiers that are arranged in the vertically expandable stack. Also, in some instances, the first cache memory 114 may include cache controller logic that may be part of system-level cache (SLC) in the core-compute die.

The first tier (Tier_1) may have a snoop filter (SF) 110. In some instances, the snoop filter (SF) 110 may be configured with coherence tracking, cache controller logic, point of coherence (PoC) and/or point of synchronization (PoS). As shown in FIG. 1A, the snoop filter 110 may be implemented in the first tier (Tier_1), e.g., as part of the core-compute die. Also, the size and configuration of the snoop filter 110 may depend on a number of processing cores 104 in the first tier (Tier_1) and their private memory caches that may work together with the system-level cache (SLC) 114 for caching data. Also, the SF sizing/configuration may be independent of the SLC and dependent on the processing cores and their caches. In some instances, the snoop filter 110 may include functionality for point of coherence and synchronization as part of core-compute die in the first tier (Tier_1). This functionality may be implemented independent of SLC size, and also, the point of coherence and synchronization may be sized depending on the number of outstanding requests being serviced.

The second tier (Tier_2) may include a second cache memory 124A coupled to the first cache memory 114. In some instances, the first tier (Tier_1) and the second tier (Tier_2) may be integrated together with the computing architecture so as to operate as a stackable cache memory architecture. In some instances, the first tier (Tier_1) may be stacked on the second tier (Tier_2) in a vertical direction. Also, in some instances, the second tier (Tier_2) may be formed as part of a second semiconductor die that is stacked on the first semiconductor die in the vertical direction.

The number (N) of additional tiers (Tier_3, . . . , Tier_N) may include one or more additional tiers with each additional tier having a corresponding cache memory 124B, . . . , 124N that is coupled to a previous cache memory in a previous tier. In some instances, the first tier (Tier_1), the second tier (Tier_2), and the one or more additional tiers (Tier_3, . . . , Tier_N) may be integrated together with the computing architecture to operate as the stackable cache memory architecture. For instance, the first tier (Tier_1) may be stacked on the second tier (Tier_2) in a vertical direction, and the first tier (Tier_1) and the second tier (Tier_2) may be stacked on the one or more additional tiers (Tier_3, . . . , Tier_N) in the vertical direction. Also, the one or more additional tiers (Tier_3, . . . , Tier_N) may be stacked on each other in the vertical direction. In some instances, the second tier and the one or more additional tiers may refer to similar or identical integrated circuits.

In some implementations, the stackable cache memory architecture may refer to a vertically expandable three-dimensional (3D) cache memory architecture. Also, each of the first cache memory, the second cache memory, and/or the one or more additional cache memories 124B, . . . , 124N may refer to a system-level cache (SLC) that are shared by the one or more processors 104 in the computing architecture.

Also, in some instances, the one or more processors 104 may be configured to use address bits so as to enable three-dimensional (3D) operation of the cache memory architecture. The one or more processors 104 may also be configured to use the address bits so as to enable the first tier (Tier_1), the second tier (Tier_2), and/or the one or more additional tiers (Tier_3, . . . , Tier_N) for the set selection, the way selection and/or the data bus arbitration, which is described in herein below in reference to FIG. 2. Also, in some instances, the interconnect logic (XP0) 108 may refer to configurable routing logic and/or switching logic that allows for integration of the first cache memory 114, the second cache memory 124A, and/or the one or more additional cache memories 124B, . . . , 124N along with the core-computing architecture so as to operate as the stackable cache memory architecture in the vertically stacked 3D expandable configuration.

In various implementations, each system-level cache may include an array of memory cells arranged in columns and rows, wherein each memory cell may be referred to as a bitcell, and wherein each bitcell may be configured to store at least one data bit value (e.g., data value associated with logical '0' or '1'). Also, each column/row of bitcells in each array may include any number of memory cells arranged in various configurations, such as, e.g., a two-dimensional (2D) array having columns and rows of bitcells arranged in a 2D grid pattern. Also, each bitcell may be implemented with random access memory (RAM) circuitry, or some other type of volatile and/or non-volatile type memory. In some instances, each memory cell may include a multi-transistor static RAM (SRAM) cell, such as, e.g., any type of SRAM cell and/or other types of complementary MOS (CMOS) SRAM cells, such as, e.g., 4T, 6T, 8T, 10T, or more transistors per bit.

As shown in FIG. 1B, the cache memory architecture 102, 102B may include a multi-tier stack configuration, including, e.g., a first tier, a second tier, and a number (N) of additional tiers, that are arranged in a vertically expandable stack. The configuration in FIG. 1B is different than the configuration in FIG. 1A in that the first tier (Tier_1) may include the one or more processors 104, the interconnect logic (XP0) 108, and the snoop filter 110 without the first cache memory 114 being provided in the first tier (Tier_1).

In some instances, the one or more processors 104 (or processing cores) and the interconnect logic (XP0) 108 may be formed in the first tier (Tier_1). The first tier (Tier_1) may be fabricated as a first semiconductor die. The cache memory 124A may be provided in the second tier (Tier_2), and also, the cache memory 124A may be coupled to the one or more processors 104 via the interconnect logic (XP0) 108. The second tier (Tier_2) may be fabricated as a second semiconductor die.

The one or more additional cache memories (124B, . . . , 124N) may be formed in one or more corresponding additional tiers (Tier_3, . . . , Tier_N), and also, the one or more additional cache memories (124B, . . . , 124N) may be coupled to the cache memory 124A in the second tier (Tier_2). In some instances, the second tier (Tier_2) and the one or more additional tiers (Tier_3, . . . , Tier_N) may be integrated together with the first tier (Tier_1) to operate as a stackable cache memory architecture. The one or more additional tiers (Tier_3, . . . , Tier_N) may be fabricated as one or more additional semiconductor dies that are vertically stacked on one another. In some instances, the one or more additional tiers may refer to similar or identical integrated circuits.

In some implementations, the interconnect logic (XP0) 108 may refer to configurable caching logic that allows for integration of the one or more processing cores 104 in the first tier (Tier_1), the cache memory 124A in the second tier (Tier_2), and the one or more additional cache memories (124B, . . . , 124N) in the one or more additional tiers (Tier_3, . . . , Tier_N) to operate as the stackable cache memory architecture.

In some implementations, the stackable cache memory architecture may refer to a vertically expandable three-dimensional (3D) cache memory architecture, wherein the first tier (Tier_1) may be stacked on the second tier (Tier_2)

in a vertical direction, and the second tier may be stacked on the one or more additional tiers (Tier_3, ..., Tier_N) in the vertical direction. In some instances, each additional tier (Tier_3, ..., Tier_N) may have a corresponding additional cache memory (124B, ..., 124N) that is coupled to a previous cache memory in a previous tier. Also, in some instances, the first tier (Tier_1), the second tier (Tier_2), and the one or more additional tiers (Tier_3, ..., Tier_N) may be integrated together to operate as the stackable cache memory architecture.

As shown in FIG. 1C, the cache memory architecture 102, 102C may include a multi-tier stack configuration, including, e.g., a first tier, a second tier, and a number (N) of additional tiers, that are arranged in a vertically expandable stack. The configuration in FIG. 1C is different than the configurations in FIG. 1A-1B in that the first tier (Tier_1) may include only the one or more processors 104, the second tier (Tier_2) may include the interconnect logic (XP0) 108, the snoop filter 110 and the first cache memory 114, and the one or more additional cache memories (124A, 124N) may be provided in the one or more additional tiers (Tier_3, ..., Tier_N).

In some instances, the one or more processors 104 (or processing cores) may be formed in the first tier (Tier_1). The first tier (Tier_1) may be fabricated as a first semiconductor die. In some instances, the interconnect logic (XP0) 108 and the cache memory 114 may be formed in the second tier (Tier_2), and the cache memory 114 may be coupled to the one or more processors 104 via the interconnect logic (XP0) 108. The second tier (Tier_2) may be fabricated as a second semiconductor die.

The one or more additional cache memories (124A, ..., 124N) may be formed in one or more corresponding additional tiers (Tier_3, ..., Tier_N), and the one or more additional cache memories (124A, ..., 124N) may be coupled to the cache memory 114 in the second tier (Tier_2). In some instances, the second tier (Tier_2) and the one or more additional tiers (Tier_3, ..., Tier_N) may be integrated together with the first tier (Tier_1) to operate as a stackable cache memory architecture. The one or more additional tiers (Tier_3, ..., Tier_N) may be fabricated as one or more additional semiconductor dies that are vertically stacked on one another. In some instances, the one or more additional tiers may refer to similar or identical integrated circuits.

In some implementations, the various cache memory schemes and techniques described herein provide for an advanced cache-computing system having multiple tiers, such as, e.g., multiple semiconductor dies having a first tier or die with processing cores, interconnect logic and expandable system-level cache dies with zero or more tiers or dies having cache storage capabilities. The caching logic may be configurable to allow system configurability during manufacturing time with the variable number of system-level cache storage dies. In one embodiment, as shown in FIG. 1A, the expandable cache may be part of a core-compute node, i.e., a component-tier providing a system-level cache (SLC) shared by the processing cores in the system alongside coherence tracking (e.g., snoop filter 110), cache interconnect logic (XP0) 108, point of coherence (PoC) and point of synchronization (PoS). The partitioning of the core-compute node in this embodiment may include the snoop filter 110 as part of the core-compute die. Point of coherence and synchronization may also be part of the core-compute die, and it may also be independent of the SLC size, and it may be sized depending on the number of outstanding requests being serviced. Also, the cache interconnect logic (XP0) 108 may be part of the core-compute die, and it may also be configurable depending on the amount of expandable SLC. As described herein below in reference to FIG. 2, SLC tags may be used as part of the expandable cache tier (or die) and/or the core-compute tier (or die) when having cache storage. In some instances, the SLC tags may be associated with SLC data entries. Also, SLC data may be part of the expandable cache tiers (or dies) and/or the core-compute die when having cache storage.

Figure 2:
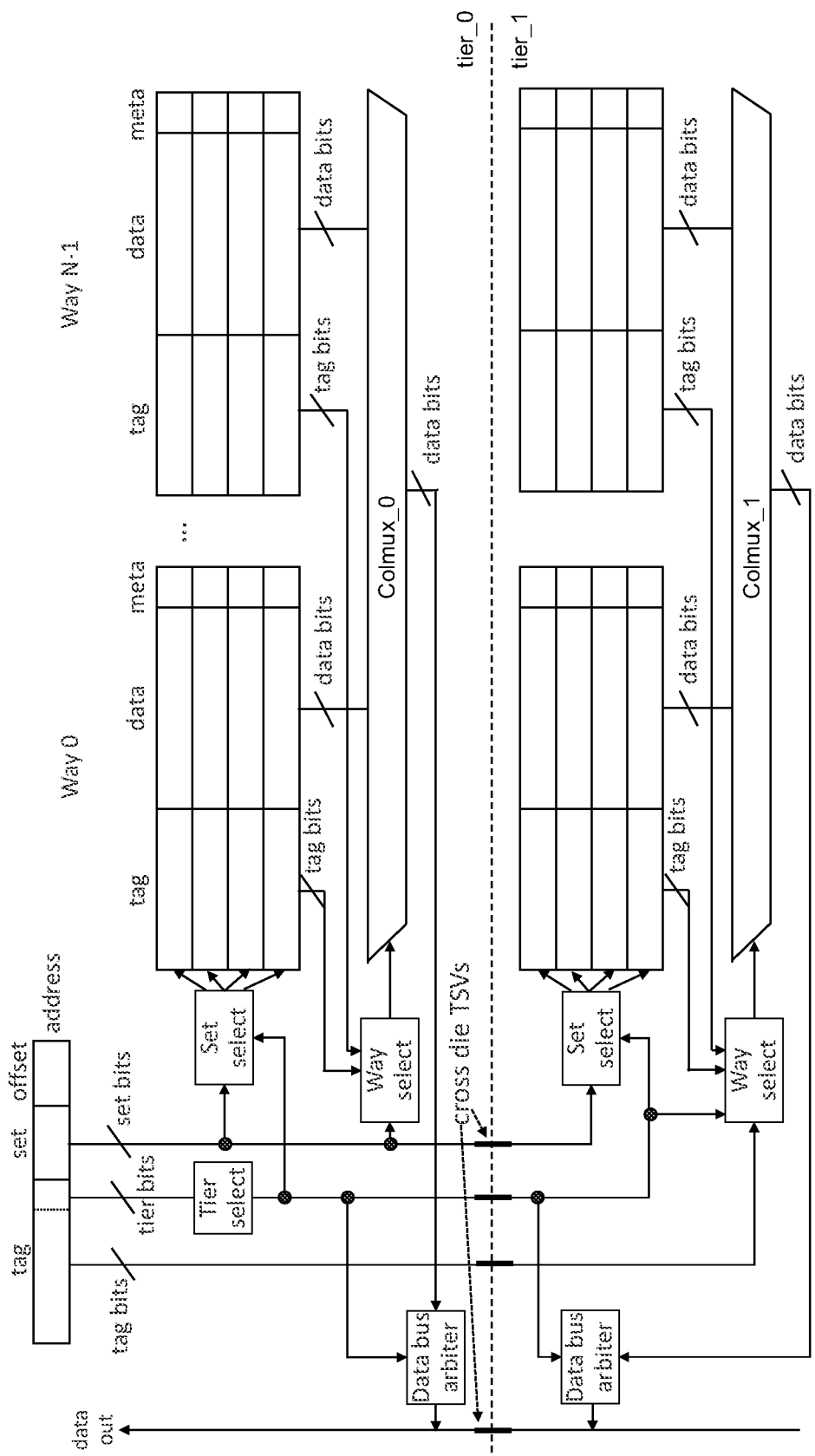
FIG. 2 illustrates a diagram of caching logic for enabling operation of cache memory architecture in accordance with implementations described herein.

FIG. 2 illustrates a diagram 200 of caching logic 202 for enabling operation of cache memory architecture in accordance with implementations described herein.

In reference to FIG. 2, the cache-control logic 202 may involve an addressing mechanism that utilizes tier bits in an address along with a tier selection mechanism. In some instances, the processor 104 may be configured to use the address bits so as to enable 3D operation of the cache memory architecture. The processor 104 may also be configured to use the address bits so as to enable the first tier, the second tier and any additional tiers for the set selection, the way selection and/or the data bus arbitration. In some instances, the addressing of tiers may be independent of the processing cores, and also, the processing cores may be configured to send requests to access (read/write) data stored in cache using the address. In this instance, the cache controller logic (e.g., in the SLC) may use particular bits in the address as tier bits. Also, the cache control logic 202 may refer to configurable caching logic that allows for integration of the processor 104 in the first tier (Tier_1), the cache memory 114 in the second tier (Tier_2), and/or the one or more additional cache memories (124A, ..., 124N) in the additional tiers (Tier_3, ..., Tier_N) to operate as the stackable cache memory architecture.

In some implementations, the cache-control logic 202 may be fabricated as the dynamically configurable caching logic during assembly that allows for integration of the processor 104 (or one or more processing cores) in the first tier (Tier_1), the first system-level cache (SLC) 114 in the second tier (Tier_2), and the one or more additional system-level caches (124A-124N) provided in the one or more additional tiers (Tier_3, ..., Tier_N) to operate as the vertically expandable 3D cache memory architecture. Further, in some instances, the one or more additional system-level caches (124A-124N) in the one or more additional tiers (Tier_3, ..., Tier_N) may be configured to operate as the vertically expandable 3D cache memory architecture during assembly for initial configuration and/or during post assembly for repair.

As shown in FIG. 2, the address bits may be segmented into tag bits, tier bits, set bits and offset bits. The tag bits and/or the set bits may be used by way select circuitry and/or set select circuitry for way selection (Way 0, ..., Way N−1). The tier bits may be used by the tier select circuitry to assist the way select circuitry and/or set select circuitry for way selection (Way 0, ..., Way N−1). The offset bits may or may not be used for other addressing purposes. The tier bits may also be used by data bus arbiter circuitry to assist with providing the data bits to the data output bus. The way selection (Way 0, ..., Way N−1) may refer to way bits that use tag bits, data bits and meta bits, wherein the way bits provide the data bits to column multiplexers (colmux_0, colmux_1, etc.) for data selection as stored in different tiers (e.g., Tier_0, Tier_1, etc.).

In some implementations, the cache-control logic 202 may be fabricated in a multi-tier configuration having multiple tiers (Tier_0, Tier_1, etc.). As described in greater detail herein in reference to FIGS. 4A-4B, the multiple tiers (Tier_0, Tier_1, etc.) may be coupled together via cross-die TSVs (Through-Silicon Vias). Also, as shown in reference to FIG. 2, the multi-tier configuration provides an expandable cache design that spans across multiple tiers (or dies). In some instances, if set and way selection occurs in the core-compute tier (e.g., Tier_1), set and way selection may occur in every tier conditioned by the set of tier bits from the accessed address. In this instance, 3D connections may not scale with the number of tiers, and as such, they may refer to a fixed number of signals that need to cross through different tiers or layers, e.g., by way of tag bits, tier bits and/or set bits. To provide the data to the compute layer, there is a single data path that is also arbitered using the tier bits, and in this way, all through die signals may be implemented with a bus and tri-state buffers. Also, for writes, the data bus may cross through multiple tiers and similar logic for set and way selection that may be used to write the data.

Figure 3:
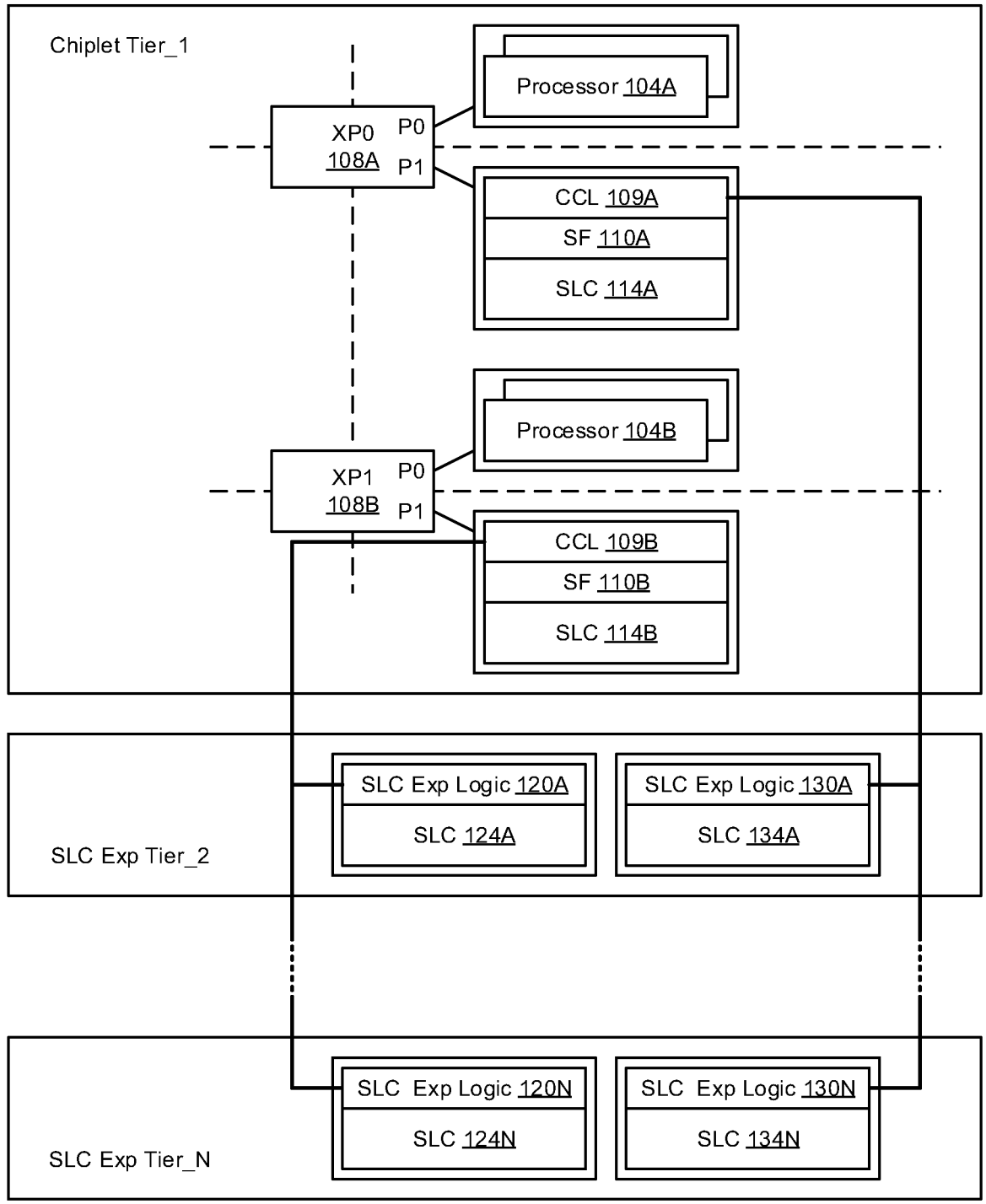
FIG. 3 illustrates a diagram of cache memory architecture in accordance with various implementations described herein.

FIG. 3 illustrates a schematic diagram 300 of cache memory architecture 302 in accordance with various implementations described herein.

As shown in FIG. 3, the cache memory architecture 302 may include a system of multiple chiplet tiers, including, e.g., a first chiplet tier (tier_1) and a number (N) of expandable system-level cache tiers (SLC Exp Tier_2, . . . , SLC Exp Tier_N). For instance, the first chiplet tier (tier_1) may have multiple processors (104A, 104B) with each having one or more processing cores. The first chiplet tier (tier_1) may also have multiple interconnect logic circuits (XP0 108A, XP1 108B) along with multiple system-level caches (SLC 114A, SLC 114B) that are coupled together to operate as a computing architecture for the multi-tiered cache memory architecture. Also, each SLC (SLC 114A, SLC 114B) may include cache control logic (CCL 109A, CCL 109B) and a snoop filter (SF 110A, SF 110B), wherein a first SLC 114A may be associated with a first CCL 109A and a first SF 110A, and a second SLC 114B may be associated with a second CCL 109B and a second SF 110B. Further, the expandable SLC tiers (SLC Exp Tier_2, . . . , SLC Exp Tier_N) may include multiple expandable SLC logic (120A, . . . , 120N and 130A, . . . , 130N) along with multiple corresponding SLCs (124A, . . . , 124N and 134A, . . . , 134N) that are coupled to the CCLs (CCL 109A and CCL 109B) in the first chiplet tier_1. In this instance, the first chiplet tier_1 and the expandable SLC tiers (SLC Exp Tier_2, . . . , SLC Exp Tier_N) may be integrated together with the computing architecture so as to operate as the vertically stackable cache memory architecture.

In some implementations, the first CCL 109A in the first chiplet tier_1 may be coupled to the SLC Exp logic (130A, . . . , 130N) in the expandable SLC tiers (SLC Exp Tier_2, . . . , SLC Exp Tier_N) so as to access the SLCs (134A, . . . , 134N). Also, the second CCL 109B in the first chiplet tier_1 may be coupled to the SLC Exp logic (120A, . . . , 120N) in the expandable SLC tiers (SLC Exp Tier_2, . . . , SLC Exp Tier_N) so as to access the SLCs (124A, . . . , 124N). Therefore, the cache memory architecture 302 may be configured to operate as a 3D chip with expandable SLC. Also, in some instances, the connecting lines between tiers may refer to 3D connections or 3D TSVs that provide for inter-tier connections between 3D vertically stacked tiers.

In some implementations, the XP interconnect logic (XP0 108A and XP1 108B) refers to routers and/or switches that are configured to connect the one or more processor cores 104A, 104B to the multi-tier system-level caches (SLCs) 114A, 114B and 124A, . . . , 124N and 134A, . . . , 134N). Also, the cache controller logic (CCL) 109A, 109B may be part of the SLCs in the core-compute die, and any additional cache controller logic may be in the cache dies as part of the SLC Exp Logic (120A, . . . , 120N and 130A, . . . , 130N).

Figure 4A:
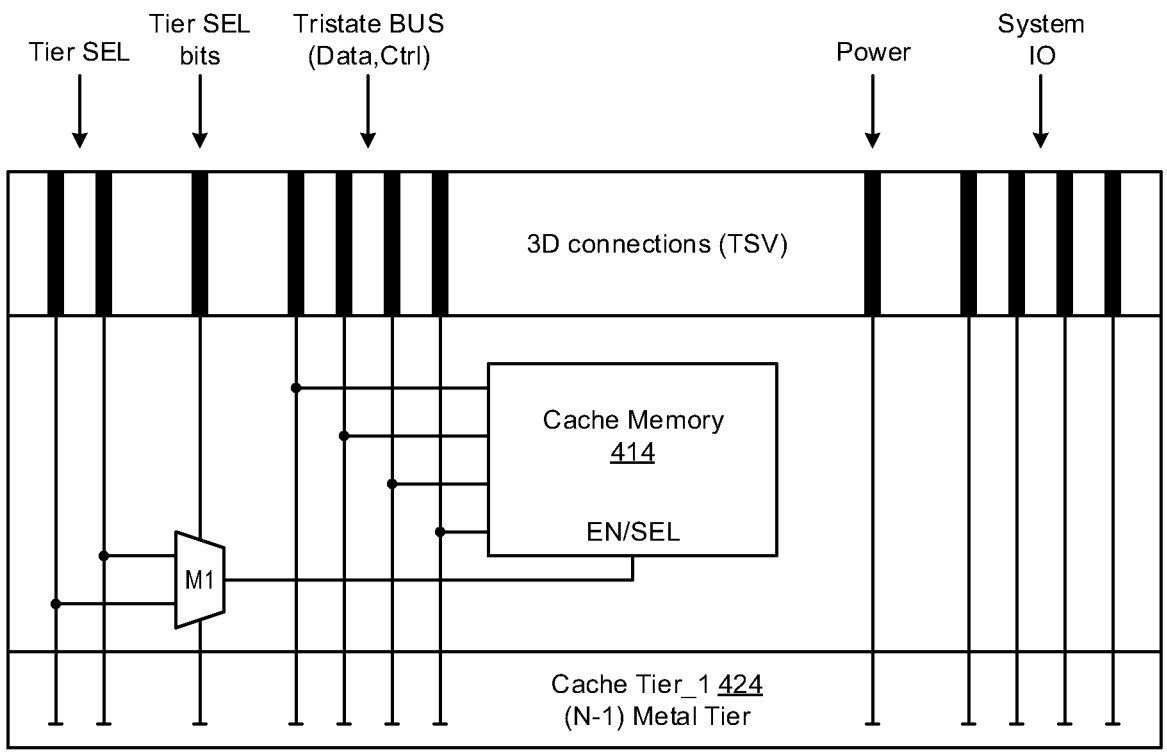
FIGS. 4A-4B illustrate diagrams of fabricating cache memory architecture in accordance with various implementations described herein.
Figure 4B:
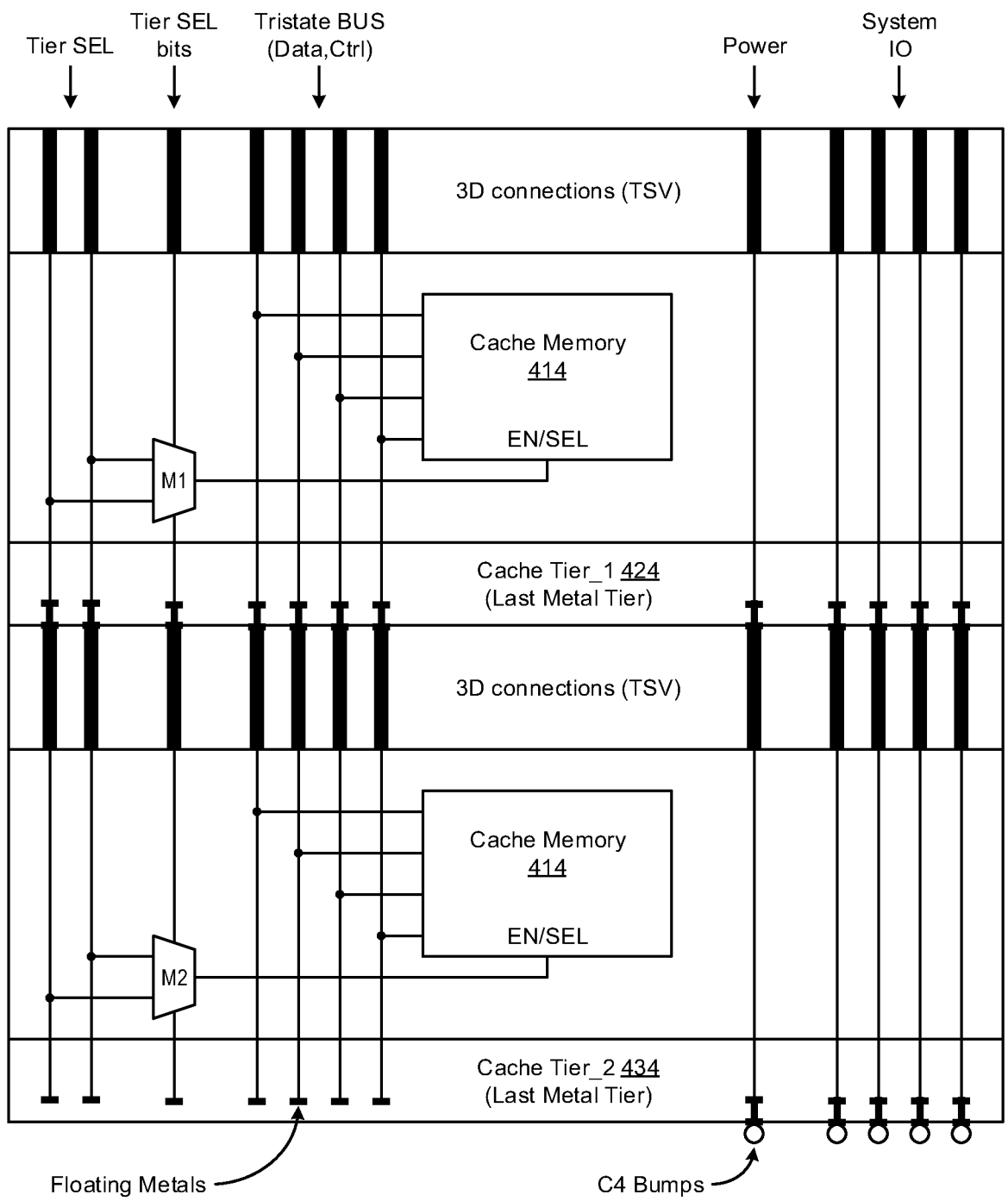

FIGS. 4A-4B illustrate diagrams of fabricating cache memory architecture 402 in accordance with various implementations described herein. In particular, FIG. 4A shows a diagram 400A of fabricating cache memory architecture 402A, and also, FIG. 4B shows another diagram 400B of fabricating cache memory architecture 402B.

In reference to FIG. 4A, the cache memory architecture 402A may be formed as an expandable 3D cache tier (or layer), and connections from the core-compute tier include data signals, control signals and/or tier-select signals. The 3D cache tier may also include power delivery signals and system input-output (I/O) signals that are fed-through from the core-compute tier. Also, the signals may extend to the (N−1) metal tier in the tier where N refers to the total number of metal tiers in the tier, and this approach enables the 3D cache tier to be expanded using a single modular design.

In some implementations, Tier SEL signals may be generated using a decoder from Tier SEL bits in the core-compute tier. In reference to making the 3D cache tier expandable, the Tier SEL signals may be multiplexed to generate the cache tier enable signal to perform read/write operations via the tri-state bus.

In some implementations, the cache memory architecture 402A may include one or more integrated tiers, including, e.g., 3D connection tier (TSV), cache memory tier (414), and cache connection tier_1 (424). The Tier SEL signals, the Tier SEL bits, the Tristate BUS signals (Data, Ctrl), the power signal, and the system IO signals may be provided to TSVs lines in the 3D connection tier (TSV). The cache memory tier (414) may include a multiplexer (M1) that receives the Tier SEL signals and enables the cache memory circuitry via an enable/select control terminal (EN/SEL). The cache connection tier_1 (424) may provide inter-tier connection nodes (and/or terminals) for conductively connecting an expandable SLC tier thereto.

In reference to FIG. 4B, the cache memory architecture 402B may be formed as an expandable 3D cache tier that is setup during 3D stacking/assembly to be expandable and/or vertically stackable. In this instance, the same 3D cache tier may be used to form and fabricate a multi-tiered 3D expandable cache memory. Prior to 3D stacking and/or assembly, the last metal tier 424 (or 3D pad connection tier) of cache tier_1 may be fabricated that may provide for 3D connections to be made to cache tier_2. In reference to cache tier_2, the memory control and bus signals may remain floating, while only the power delivery and system I/O signals are connected to the C4 bumps through the fabrication of the last metal tier 434 of the cache tier_2. Thus, the processing steps for the cache tier_1 and the cache tier_2 may differ only by one last metal tier lithography mask. This allows the expandable 3D cache tier to be substantially cost-effective for manufacturing.

In some implementations, the cache memory architecture 402B may include two or more integrated tiers, wherein each cache tier (tier_1, tier_2) may include a 3D connection tier (TSV), a cache memory tier (414), and a cache connection tier_1 (424, 434). The Tier SEL signals, the Tier SEL bits, the Tristate BUS signals (Data, Ctrl), the power signal, and the system IO signals may be provided to TSVs lines in each of the 3D connection tier (TSV). Each cache memory tier (414) may include a multiplexer (M1, M2) that receives the Tier SEL signals and enables the cache memory circuitry via an enable/select control terminal (EN/SEL). Also, each cache connection tier_1 (424, 434) may provide inter-tier connection nodes (or terminals) for conductively connecting the expandable SLC tiers (or layers) to a previous tier or a next tier.

In various implementations, the stackable cache memory architecture 402 may refer to a vertically expandable 3D cache memory architecture. The control logic may be fabricated as dynamically configurable caching logic during assembly that allows for the integration of one or more processing cores in a first tier, a system-level cache in a second tier, and one or more additional system-level caches in one or more additional tiers so as to operate as the vertically expandable 3D cache memory architecture. The one or more additional system-level caches in the one or more additional tiers may be configured to operate as the vertically expandable 3D cache memory architecture during assembly for initial configuration and during post assembly for repair.

In various implementations, the first tier may be fabricated as a core-compute semiconductor die, and the second tier may be fabricated as a second semiconductor die, and the one or more additional tiers may be fabricated as additional semiconductor dies in a vertical stack. Also, each system-level cache may be fabricated similar or identical in physical design, and during assembly, a fabrication method may determine whether a last system-level cache is fabricated. For instance, if fabricated, then the last system-level cache may be coupled to a next system-level cache in a next tier, and if not fabricated, then external connections may be coupled to conductive bumps. Also, the first tier may be stacked on the second tier in a vertical direction, and the second tier may be stacked on the one or more additional tiers in the vertical direction, and also, the one or more additional tiers may be stacked on each other in the vertical direction.

Figure 5:
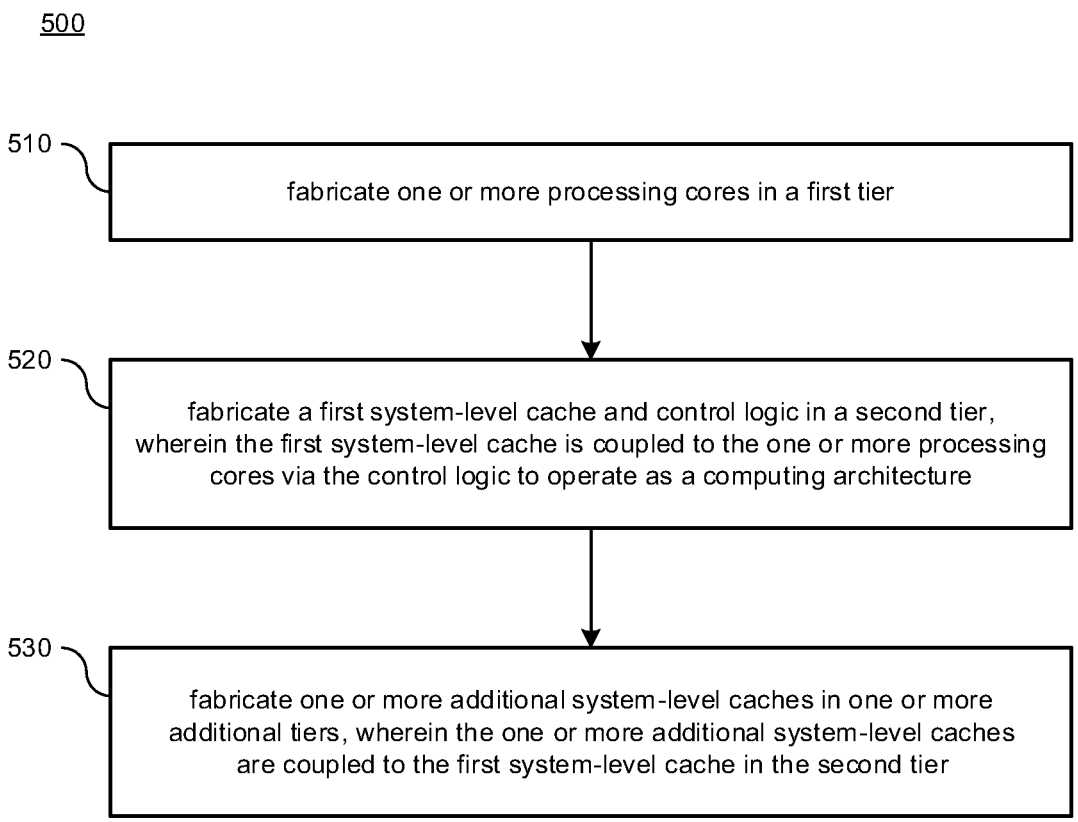
FIG. 5 illustrates a process diagram of a method for providing cache memory architecture in accordance with implementations described herein.

FIG. 5 illustrates a process diagram of a method 500 for providing cache memory architecture in accordance with implementations described herein.

It should be understood that even though method 500 indicates a particular order of operation execution, in some cases, various certain portions of the operations may be executed in a different order, and on different systems. In other cases, additional operations and/or steps may be added to and/or omitted from method 500. Also, method 500 may be implemented in hardware and/or software. If implemented in hardware, the method 500 may be implemented with various components and/or circuitry, as described herein in reference to FIGS. 1A-4B. Also, if implemented in software, method 500 may be implemented as a program and/or software instruction process configured for providing cache memory schemes and techniques, as described herein. In addition, if implemented in software, instructions related to implementing the method 500 may be stored in memory and/or a database. For instance, various types of computing devices having a processor and memory may be configured to perform method 500.

In various implementations, method 500 may refer to a method of designing, providing, building, fabricating and/or manufacturing various cache memory architecture as an integrated system, device and/or circuit that may involve use of the various IC circuit components described herein so as to implement various cache memory schemes and techniques associated therewith. In some instances, the cache memory architecture may be integrated with computing circuitry and related components on multiple chips, and the cache memory architecture may also be implemented in various embedded systems for various electronic, mobile and Internet-of-things (IoT) applications.

At block 510, method 500 may fabricate one or more processing cores in a first tier. In some implementations, the one or more processing cores may be integrated as part of a central processing unit (CPU) in an integrated computing system. Also, in some instances, the first tier may be fabricated as a first semiconductor die.

At block 520, method 500 may fabricate a first system-level cache and control logic in a second tier, and the first system-level cache may be coupled to the one or more processing cores via the control logic so as to operate as computing architecture. In some implementations, the one or more processing cores and the first system-level cache may be fabricated in the same tier. Also, in some instances, the second tier may be fabricated as a second semiconductor die.

Also, at block 530, method 500 may fabricate one or more additional system-level caches in one or more additional tiers, and the one or more additional system-level caches may be coupled to the first system-level cache in the second tier. The first tier, the second tier, and/or the one or more additional system-level caches may be integrated together with the computing architecture so as to operate as a stackable cache memory architecture. In some instances, the stackable cache memory architecture may refer to a vertically expandable three-dimensional (3D) cache memory architecture. Also, in some instances, the first tier may be fabricated as a first semiconductor die, the second tier may be fabricated as a second semiconductor die, and the one or more additional tiers may be fabricated as one or more additional semiconductor dies. Also, in some instances, the first tier may be stacked on the second tier in a vertical direction, the second tier may be stacked on the one or more additional tiers in the vertical direction, and the one or more additional tiers may be stacked on each other in the vertical direction.

Also, in some implementations, fabricating control logic may refer to fabricating the control logic as dynamically configurable caching logic during assembly that may allow for integration of the one or more processing cores in the first tier, the first system-level cache in the second tier, and the one or more additional system-level caches in the one or more additional tiers so as to operate as the vertically expandable 3D cache memory architecture. In some instances, the one or more additional system-level caches in the one or more additional tiers may be configured to operate as the vertically expandable 3D cache memory architecture during assembly for initial configuration and/or during post assembly for repair.

Moreover, in some implementations, each system-level cache may be similar or identical in physical design, and during assembly, method 500 may comprise determining whether a last system-level cache is fabricated. In some instances, if fabricated, the last system-level cache may be coupled to a next system-level cache in a next tier, and also, if not fabricated, external connections may be coupled to conductive bumps.

It should be intended that the subject matter of the claims not be limited to the implementations and illustrations provided herein, but include modified forms of those implementations including portions of implementations and combinations of elements of different implementations in accordance with the claims. It should be appreciated that in the development of any such implementation, as in any engineering or design project, numerous implementation-specific decisions should be made to achieve developers' specific goals, such as compliance with system-related and business related constraints, which may vary from one implementation to another. Moreover, it should be appreciated that such a development effort may be complex and time consuming, but would nevertheless be a routine undertaking of design, fabrication, and manufacture for those of ordinary skill having benefit of this disclosure.

It should be appreciated by those skilled in the art that even though the various implementations described herein may be directed to 3D expandable system-level cache (SLC) architecture, this disclosure and the various aspects related thereto should not be necessarily limited to an SLC, and thus, the various implementations described herein may also be used by any type of cache hierarchy in various computing applications.

Described herein are various implementations of a device. The device may include a first tier having a processor and a first cache memory that are coupled together via control logic to operate as a computing architecture. The device may include a second tier having a second cache memory that is coupled to the first cache memory. Also, the first tier and the second tier may be integrated together with the computing architecture to operate as a stackable cache memory architecture.

Described herein are various implementations of a computing system. The computing system may include one or more processing cores and control logic formed in a first tier. The computing system may include a cache memory formed in a second tier, and the cache memory may be coupled to the one or more processing cores via the control logic. The computing system may include an additional cache memory formed in an additional tier, and the additional cache memory may be coupled to the cache memory in the second tier. The second tier and the additional tier may be integrated together with the first tier to operate as a stackable cache memory architecture.

Described herein are various implementations of a method. The method may include fabricating one or more processing cores in a first tier. The method may include fabricating a first system-level cache and control logic in a second tier, and the first system-level cache may be coupled to the one or more processing cores via the control logic to operate as a computing architecture. The method may include fabricating one or more additional system-level caches in one or more additional tiers, and the one or more additional system-level caches may be coupled to the first system-level cache in the second tier. The first tier, the second tier, and the one or more additional system-level caches may be integrated together with the computing architecture to operate as a stackable cache memory architecture.

Reference has been made in detail to various implementations, examples of which are illustrated in the accompanying drawings and figures. In the following detailed description, numerous specific details are set forth to provide a thorough understanding of the disclosure provided herein. However, the disclosure provided herein may be practiced without these specific details. In some other instances, well-known methods, procedures, components, circuits and networks have not been described in detail so as not to unnecessarily obscure details of the embodiments.

It should also be understood that, although the terms first, second, etc. may be used herein to describe various elements, these elements should not be limited by these terms. These terms are only used to distinguish one element from another. For example, a first element could be termed a second element, and, similarly, a second element could be termed a first element. The first element and the second element are both elements, respectively, but they are not to be considered the same element.

The terminology used in the description of the disclosure provided herein is for the purpose of describing particular implementations and is not intended to limit the disclosure provided herein. As used in the description of the disclosure provided herein and appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "includes," "including," "comprises," and/or "comprising," when used in this specification, specify a presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. The terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised in accordance with the disclosure herein, which may be determined by the claims that follow.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device comprising:
   a first tier comprising only one tier having a processor and cache control logic configured to operate as a computing architecture, wherein the processor and the cache control logic are disposed together in the only one tier in the first tier without cache memory being disposed in the only one tier in the first tier;
   a snoop filter operably connected to the cache control logic and configured for coherence tracking;
   a second tier having a first cache memory coupled to the processor via the cache control logic in the first tier, wherein only the first cache memory is disposed in the second tier, and wherein the second tier is separate from the first tier; and
   a third tier having a second cache memory coupled to the first cache memory in the second tier, wherein only the second cache memory is disposed in the third tier, and wherein the third tier is separate from the first tier and the second tier,
   wherein the first tier, the second tier and the third tier are integrated together with the computing architecture to operate as a stackable cache memory architecture.

2. The device of claim 1, wherein the cache control logic comprises configurable caching logic that allows for integration of the first cache memory and the second cache memory with the computing architecture to operate as the stackable cache memory architecture.

3. The device of claim 1, wherein the stackable cache memory architecture refers to a vertically expandable three-dimensional (3D) cache memory architecture, and wherein each of the first cache memory and the second cache memory refers to a system-level cache (SLC) that are shared by the processor in the computing architecture.

4. The device of claim 1, wherein the first tier is stacked on the second tier in a vertical direction, wherein the first tier is formed as part of a first semiconductor die, and wherein the second tier is formed as part of a second semiconductor die that is stacked on the first semiconductor die in the vertical direction.

5. The device of claim 1, wherein the processor is configured to use address bits so as to enable three-dimensional (3D) operation of the cache memory architecture.

6. The device of claim 5, wherein the address bits include one or more tier bits, and wherein the processor is configured to use the one or more tier bits of the address bits so as to enable the first tier and the second tier.

7. The device of claim 1, further comprising:
one or more additional tiers with each additional tier having a cache memory that is coupled to a previous cache memory in a previous tier, and
wherein the first tier, the second tier, and the one or more additional tiers are integrated together with the computing architecture to operate as the stackable cache memory architecture.

8. The device of claim 7, wherein the first tier is stacked on the second tier in a vertical direction, and wherein the first tier and the second tier are stacked on the one or more additional tiers in the vertical direction, and wherein the one or more additional tiers are stacked on each other in the vertical direction.

9. A computing system comprising:
a first tier having one or more processing cores along with cache control logic physically disposed in the first tier without cache memory being physically disposed in the first tier;
a second tier having only one cache memory without the cache control logic being physically disposed in the second tier, wherein the cache memory is coupled to the one or more processing cores via the cache control logic, and wherein the second tier is separate from the first tier; and
an additional tier having only one additional cache memory, wherein the additional cache memory in the additional tier is coupled to the cache memory in the second tier,
wherein the second tier and the additional tier are integrated together with the first tier to operate as a stackable cache memory architecture.

10. The system of claim 9, wherein the cache control logic comprises configurable caching logic that allows for integration of the one or more processing cores in the first tier, the cache memory in the second tier, and the additional cache memory in the additional tier to operate as the stackable cache memory architecture.

11. The system of claim 9, wherein the first tier is fabricated as a first semiconductor die, and wherein the second tier is fabricated as a second semiconductor die, and wherein the additional tier is fabricated as an additional semiconductor die.

12. The system of claim 9, wherein the stackable cache memory architecture refers to a vertically expandable three-dimensional (3D) cache memory architecture, wherein the first tier is stacked on the second tier in a vertical direction, and wherein the second tier is stacked on the additional tier in the vertical direction.

13. The system of claim 9, wherein the additional tier refers to:
one or more additional tiers with each additional tier having an additional cache memory that is coupled to a previous cache memory in a previous tier, and
wherein the first tier, the second tier, and the one or more additional tiers are integrated together to operate as the stackable cache memory architecture.

14. A method comprising:
fabricating only one or more processing cores and cache control logic in a first tier without cache memory being physically disposed in the first tier;
fabricating only a first system-level cache in a second tier without the cache control logic being physically disposed in the second tier, wherein the first system-level cache is coupled to the one or more processing cores via the cache control logic to operate as a computing architecture, and wherein the second tier is separate from the first tier; and
fabricating one or more additional system-level caches in one or more additional tiers, wherein the one or more additional system-level caches are coupled to the first system-level cache in the second tier, and the one or more additional system-level caches in the one or more additional tiers are coupled to the one or more processing cores via the cache control logic that is disposed in the first tier,
wherein the first tier, the second tier, and the one or more additional system-level caches are integrated together with the computing architecture to operate as a stackable cache memory architecture.

15. The method of claim 14, wherein the stackable cache memory architecture refers to a vertically expandable three-dimensional (3D) cache memory architecture.

16. The method of claim 15, wherein fabricating the cache control logic refers to fabricating the cache control logic as dynamically configurable caching logic during assembly that allows for integration of the one or more processing cores in the first tier, the first system-level cache in the second tier, and the one or more additional system-level caches in the one or more additional tiers to operate as the vertically expandable 3D cache memory architecture.

17. The method of claim 16, wherein the one or more additional system-level caches in the one or more additional tiers are configured to operate as the vertically expandable 3D cache memory architecture during assembly for initial configuration and during post assembly for repair.

18. The method of claim 14, wherein the first tier is fabricated as a first semiconductor die, and wherein the second tier is fabricated as a second semiconductor die, and wherein the one or more additional tiers are fabricated as one or more additional semiconductor dies.

19. The method of claim 18, further comprising:
during assembly, determining whether a last system-level cache is fabricated,
wherein each system-level cache is similar in physical design,
wherein if fabricated, the last system-level cache is coupled to a next system-level cache in a next tier, and
wherein if not fabricated, external connections are coupled to conductive bumps.

20. The method of claim 14, wherein the first tier is stacked on the second tier in a vertical direction, wherein the second tier is stacked on the one or more additional tiers in the vertical direction, and wherein the one or more additional tiers are stacked on each other in the vertical direction.

* * * * *